United States Patent
Geib et al.

(10) Patent No.: US 6,278,734 B1
(45) Date of Patent: Aug. 21, 2001

(54) PROCESS FOR DECODING AND CODING A COMPRESSED VIDEO DATA STREAM WITH REDUCED MEMORY REQUIREMENTS

(75) Inventors: Heribert Geib, Grafing; Stefan Prange, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/981,267

(22) PCT Filed: Jun. 13, 1996

(86) PCT No.: PCT/DE96/01051

§ 371 Date: Dec. 22, 1997

§ 102(e) Date: Dec. 22, 1997

(87) PCT Pub. No.: WO97/02707

PCT Pub. Date: Jan. 23, 1997

(30) Foreign Application Priority Data

Jul. 6, 1995 (DE) .............................................. 195 24 688

(51) Int. Cl.[7] .............................. H04B 1/66; H04N 7/12
(52) U.S. Cl. ........................... 375/240; 348/409; 348/415
(58) Field of Search .................................... 348/416, 409, 348/415, 411–413, 699, 384, 390; 386/109, 111; 382/236, 238; 375/240

(56) References Cited

U.S. PATENT DOCUMENTS 5,010,402 * 4/1991 Nishino .................................. 348/405
5,157,732 * 10/1992 Ishii et al. .............................. 348/699
5,576,765 * 11/1996 Cheney et al. ........................ 348/407
5,995,727 * 11/1999 Wise et al. ....................... 395/200.77

FOREIGN PATENT DOCUMENTS 5-176099 * 7/1993 (JP) .................................. H04N/7/08

OTHER PUBLICATIONS

International Standard ISO–IEC 11172–2: Coding of Moving Pictures and Associated Audio, ISO/MPEG, (1993), 8 pages.

Draft International Standard ISO/IEC 13818–2, Generic Coding of Moving Pictures and Associated Audio 25.03.1994, pp. 1–230.

* cited by examiner

*Primary Examiner*—Vu Le
(74) *Attorney, Agent, or Firm*—Schiff Hardin & Waite

(57) ABSTRACT

The method is for coding and for decoding a video data stream, only one picture which is required for the reconstruction of interpolated pictures being stored in completely decompressed form during the coding or during the decoding of the video data stream. That part of a second basic picture (G2) which is required in decompressed form for the construction or reconstruction of an interpolated picture is temporarily decompressed in each case. A further possibility envisages storing a first basic picture (G1) and the second basic picture (G2) in compressed form and in each case temporarily decompressing only those regions which are required for the construction or reconstruction of an interpolated picture.

20 Claims, 3 Drawing Sheets

PROCESS FOR DECODING AND CODING A COMPRESSED VIDEO DATA STREAM WITH REDUCED MEMORY REQUIREMENTS

BACKGROUND OF THE INVENTION

Method for decoding and coding a compressed video data stream with a reduced memory requirement The present standards for compressing video data, MPEG1 and MPEG2, operate in accordance with the principles of prediction and transformation. A distinction is made between three differently coded types of pictures. So-called I pictures (intra-coded pictures) are only transform-coded. The transform used is the discrete cosine transform (DCT). P pictures are predicted from the respectively preceding I picture or P picture. The difference between the predicted picture and the actual picture is DCT-transformed. The third type of pictures are the so-called B pictures, which are bidirectionally predicted from the respectively preceding I picture or P picture and from the respectively succeeding I picture or P picture. The difference between the predicted picture and the actual picture is again DCT-transformed.

An MPEG decoder must therefore make available the data of two pictures (I picture and P picture) for the reconstruction of the B pictures. Accordingly, the memory requirement for pictures is high.

The fundamental mode of operation of the compression methods MPEG1 and MPEG2 has been disclosed to the person skilled in the art by various publications (D. J. Le Gall, The MPEG Video Compression Algorithm, Signal Processing: Image Communication 4, pp. 129–140, 1992; International Standard ISO/IEC 11172-2: Coding of Moving Pictures and Associated Audio, ISO/MPEG, 1993 and Draft International Standard ISO/IEC 13818-2, Generic Coding of Moving Pictures and Associated Audio, 25.3.1994, 1994).

In order to improve the quality of the prediction in those picture areas in which moving objects occur, use is made of so-called motion-compensated prediction. The principles of the motion estimation required for this purpose and their application for the motion-compensated prediction have been disclosed to the person skilled in the art, for example by (M. Bierling, Displacement estimation by hierarchical block matching, 3rd SPIE Symp. on Visual Communications, Cambridge, Mass., November 1988, 1988) and (Draft International Standard ISO/ICE 13818-2, Generic Coding of Moving Pictures and Associated Audio, 25.3.1994, 1994).

A distinction is made between three differently coded types of pictures. So-called I pictures are transmitted without any chronological prediction, but rather are subjected only to intra-picture coding, preferably DCT coding with subsequent quantization of the coding transform coefficients. In the context of this patent application, "intra-picture coding" is to be understood quite generally as any method which is suitable for treating local correlations in video data. The so-called P pictures are predicted with the aid of the DPCM loop from chronologically preceding I pictures or P pictures (forward prediction). The difference between the predicted picture and the actual picture is subjected to intra-picture coding, preferably to transformation using a DCT with subsequent quantization of the coding transform coefficients. So-called B pictures, which are also designated as interpolated pictures in the context of the present patent application, are chronologically situated between an I picture and a P picture or between two P pictures. B pictures are determined by means of (bidirectional) motion-compensated interpolation from a chronologically preceding I picture or P picture and from a chronologically succeeding I picture or P picture. In this case, the expressions (chronologically) "succeeding" and "preceding" do not refer to the order in which these pictures are transmitted in the video data stream of the compressed pictures, but rather they refer to the order in which these pictures are recorded/reproduced. In the same way as P pictures, B pictures, too, are coded in the form of quantized coding transform coefficients of a difference picture.

In the case of currently known implementations, the reconstruction of a B picture by means of motion-compensated interpolation from a chronologically preceding I picture or P picture and from a chronologically succeeding I picture or P picture necessitates the provision of the two reference pictures (which are also occasionally designated as support pictures in the literature) in fully decoded form.

Therefore, two fully decoded reference pictures (I pictures or P pictures) have to be stored in a frame store in the case of the methods belonging to the prior art for carrying out motion-compensated interpolation.

The re-interlacing during the video output requires further storage capacity. The overall required memory is a decisive cost factor in the hardware used for decoding and encoding. A reduction in the storage capacity required is therefore desirable.

SUMMARY OF THE INVENTION

The invention is based on the problem of specifying a method for decoding compressed video data with a reduced memory requirement.

In general terms the present invention is a method for the iterative decoding of compressed video data streams which have a sequence of basic pictures and interpolated pictures. A first basic picture is stored in a reference picture memory. A second basic picture is stored in compressed form in a buffer memory. The following steps are provided for a reconstruction of at least a first interpolated picture, which steps are executed iteratively in each case for the reconstruction of an interpolated picture: only a part of the second basic picture which is required for the reconstruction of a part of the first interpolated picture is decompressed in each case, the decompressed part of the second basic picture is stored in a second search area memory during a time in which the part of the first interpolated picture is reconstructed, and the part of the interpolated picture is reconstructed using the first basic picture and the decompressed part of the second basic picture.

Advantageous developments of the present invention are as follows.

A no longer required part of the decompressed part of the second basic picture is overwritten in the second search area memory by a following decompressed part, of the second basic picture, which is required for the reconstruction of a following part of the first interpolated picture.

An end part, which is no longer required for the reconstruction of a last part of a preceding interpolated picture, of the decompressed part of the second basic picture is overwritten in the second search area memory by a beginning part of the decompressed part, of the second basic picture, which is required for the reconstruction of a first part of a subsequent interpolated picture.

The first basic picture is stored in completely decompressed form in the reference picture memory.

In the event of a further basic picture being received, the second basic picture is completely decompressed. The completely decompressed second basic picture is stored in the reference picture memory. The further basic picture is stored in compressed form in the buffer memory.

One physical memory is used to realize the reference picture memory and the second search area memory.

The first basic picture is stored in compressed form in the reference picture memory. The following additional steps are provided for the reconstruction of the at least first interpolated picture, which steps are executed iteratively in each case for the reconstruction of an interpolated picture: only a part of the first basic picture which is required for the reconstruction of a part of the first interpolated picture is decompressed in each case, the decompressed part of the first basic picture is stored in a first search area memory during a time in which the part of the first interpolated picture is reconstructed, the part of the first interpolated picture is reconstructed using the decompressed part of the first basic picture and the decompressed part of the second basic picture, the decompressed part of the first basic picture is compressed, the compressed part of the first basic picture is stored in the reference picture memory, the decompressed part of the second basic picture is compressed, and the compressed part of the second basic picture is stored in the buffer memory.

A no longer required part of the decompressed part of the first basic picture is overwritten in the first search area memory by a following decompressed part, of the first basic picture, which is required for the reconstruction of a following part of the first interpolated picture.

An end part, which is no longer required for the reconstruction of a last part of a preceding interpolated picture, of the decompressed part of the first basic picture is overwritten in the first search area memory by a beginning part of the decompressed part, of the first basic picture, which is required for the reconstruction of a first part of a subsequent interpolated picture.

In the event of a further basic picture being received, the first basic picture is completely decompressed. The second basic picture is then stored in compressed form in the reference picture memory, and the further basic picture is stored in compressed form in the buffer memory.

The present invention is also a method for the iterative coding of compressed video data streams which have a sequence of basic pictures and interpolated pictures. A first basic picture is stored in a reference picture memory. An uncompressed second basic picture is compressed. The compressed second basic picture is stored in an output buffer. The following steps are provided for a construction of at least a first interpolated picture, which steps are executed iteratively in each case for the construction of an interpolated picture: only a part of the compressed second basic picture which is required for the construction of a part of the first interpolated picture is decompressed in each case, the decompressed part of the second basic picture is store din a second search area memory during a time in which the part of the first interpolated picture is constructed, and the part of the first interpolated picture is constructed using the first basic picture and the decompressed part of the second basic picture.

Advantageous developments of this embodiment of the present invention are as follows.

A no longer required part of the decompressed part of the second basic picture is overwritten by a following decompressed part, of the second basic picture, which is required for the construction of a following part of the first interpolated picture.

An end part, which is no longer required for the construction of a last part of a preceding interpolated picture, of the decompressed part of the second basic picture is overwritten in the second search area memory by a beginning part, of the second basic picture, which is required for the construction of a first part of a subsequent interpolated picture.

The first basic picture is stored in uncompressed form in the reference picture memory. When the first basic picture is transmitted to a receiver unit, the second basic picture is completely decompressed. The decompressed second basic picture is stored in the reference picture memory, and a further basic picture is stored in compressed form in the output buffer.

The first basic picture is compressed. The compressed first basic picture is stored in the reference picture memory. The following additional steps are provided for the construction of the at least first interpolated picture, which steps are executed iteratively in each case for the construction of an interpolated picture: only a part of the compressed first basic picture which is required for the construction of a part of the first interpolated picture is decompressed in each case, the decompressed part of the first basic picture is stored in a first search area memory during a time in which the part of the first interpolated picture is constructed, and the part of the interpolated picture is constructed using the uncompressed first basic picture and the decompressed part of t he second basic picture.

A no longer required part of the decompressed part of the first basic picture is overwritten by a following decompressed part, of the first basic picture, which is required for the construction of a following part of the first interpolated picture.

An end part, which is no longer required for the construction of a last part of a preceding interpolated picture, of the decompressed part of the first basic picture is overwritten in the first search area memory by a beginning part, of the first basic picture, which is required for the construction of a first part of a subsequent interpolated picture.

When the first basic picture is transmitted to a receiver unit, a further basic picture is stored in compressed form in the first output buffer.

The invention is in no way restricted to the area of transform coding, and is in no way whatsoever restricted to the area of block-by-block DCT coding of DCT decoding. Since no preconditions have to be made concerning. the type of intra-picture coding, the invention can be applied in connection with virtually all known methods, or methods to be developed in future, of intra-picture coding, for example also in connection with so-called quadtree coding or in connection with methods based on object segments. The decisive prerequisite for the applicability of the invention is the (bidirectional) motion-compensated interpolation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

The invention will be explained further with reference to FIGS. 1 to 4a, b.

In the further context of this patent application, both the I pictures and the P pictures are referred to as basic pictures G. The B pictures are referred to as interpolated pictures B.

Figure 1:
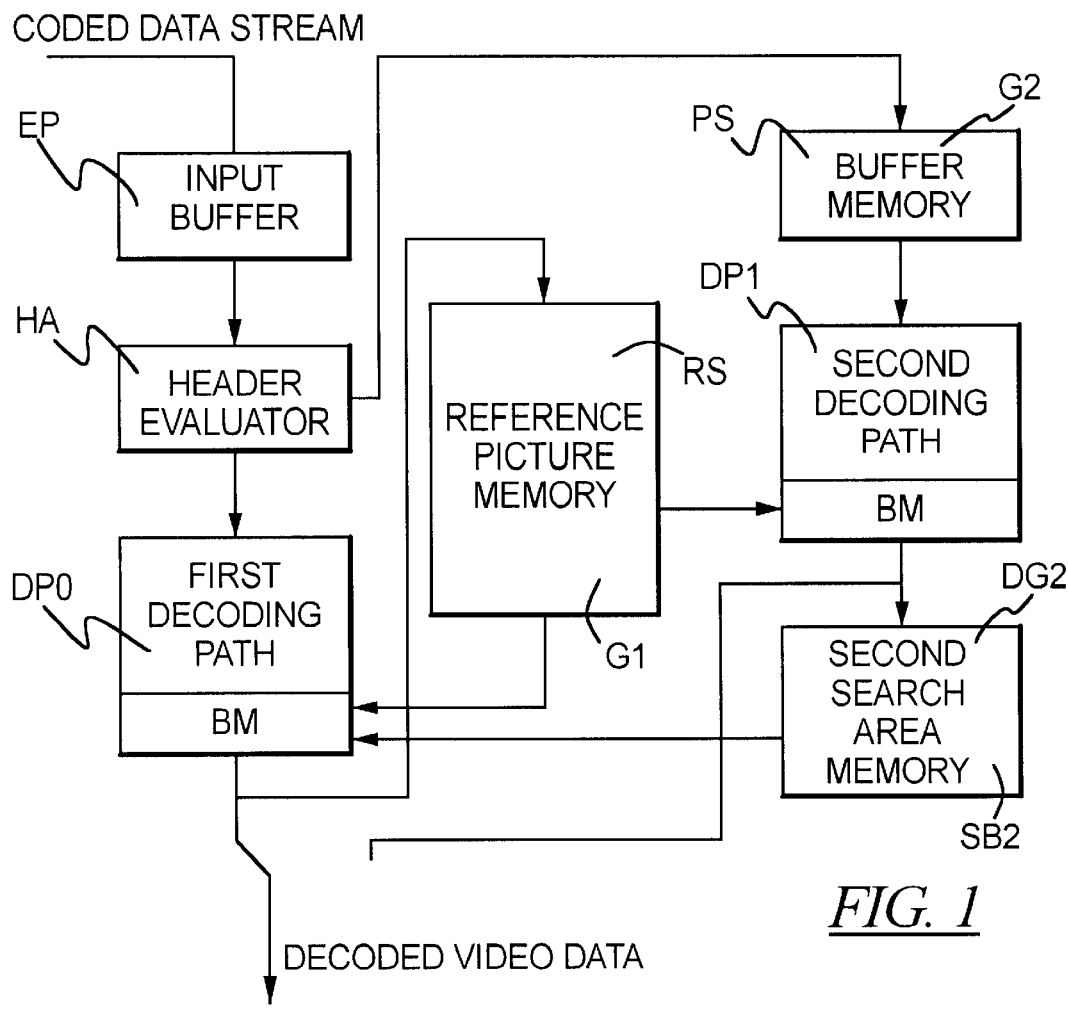
FIG. 1 shows a block diagram which describes the method of the present invention.
Figure 2:
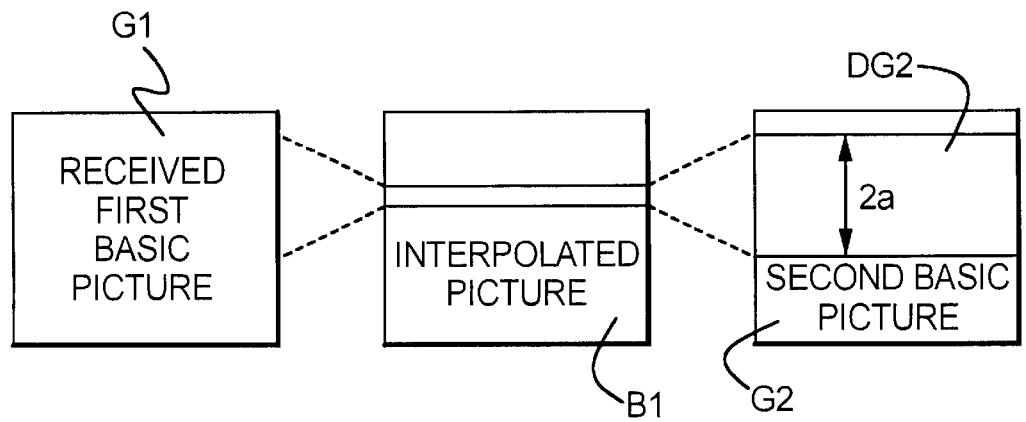
FIG. 2 shows a sketch illustrating those decoded areas of the reference pictures which are required for the reconstruction of a macroblock line of a B picture.

FIG. 1 outlines the method in the form of a block diagram.

A coded data stream, which is composed of a sequence of basic pictures G and interpolated pictures B in coded form, is first of all loaded into an input buffer EP. When using the MPEG2 method, the input buffer EP has, for example, a minimum size of 1.75 Mbits, where one Mbit is 1024 * 1024 bits, that is to say 1048576 bits.

The data are read from the input buffer EP at a variable rate controlled by the decoder and are fed to a header evaluation arrangement HA. The header evaluation arrangement HA determines what type of picture the received picture is.

A first received basic picture G1 is decoded in a first decoding path DP0 and is stored in a reference picture memory RS.

The memory requirement is reduced if a second basic picture G2 is stored in compressed form in a buffer memory PS. Since, however, at least that part of the second basic picture G2 which is necessary for reconstruction is required in uncompressed form for the reconstruction of an interpolated picture B, it is necessary in each case, as described below, to decompress a part of the second basic picture G2 stored in compressed form. To ensure that this component of the decompressed data of the second basic picture G2 is kept small, use is made of the fact that upper limits for the search area are prescribed in the MPEG1 and MPEG2 standards for video coding and video decoding. The search area refers to that area of the second basic picture G2 which is required together with the first basic picture G1 to reconstruct a macroblock line of the interpolated picture B (cf. FIG. 2).

The idea is that the part of the second basic picture G2 which is decoded in a second decoding path DP1 and is stored in decompressed form (DG2)in a second search area memory SB2 is always only that part of the said second basic picture G2 to which motion vectors of exactly that part of the interpolated picture B which is to be reconstructed can refer. The method can also be used for coding, which is explained below.

This means that, for example using a motion estimation BM of the first basic picture G1, the corresponding part of the second basic picture G2 is decompressed and is stored in the second search area memory SB2.

The first basic picture G1 is therefore stored in fully decompressed form in a reference picture memory RS. In a further embodiment, it is also possible, as described below, to store the first basic picture G1 in compressed form.

The second basic picture G2 is stored in compressed form in the buffer memory PS. The buffer memory PS must be designed for the "worst case", that is to say its storage capacity must correspond at least to the standardized "video buffering verifier" buffer (VBV buffer). In the case of MPEG2 for digital high-definition television (HDTV), the size of the VBV buffer is approximately 9.4 Mbits (1 Mbit=1024×1024 bits).

It is now necessary to ensure the availability in each case of the search area, required at a specific point in time, from the second basic picture G2 in decompressed form DG2. For the decoding of a macroblock line of a first interpolated picture B1, two a macroblock lines of the second basic picture G2 in decompressed form DG2 must be present in each case for this purpose. A macroblock line consists of horizontally consecutive macroblocks, and two a macroblock lines form the total search area required (cf. FIG. 2).

The search area must in each case be shifted in a macroblock line-by-macroblock line manner with the B picture macroblock lines to be decoded. The decoding of the search area must therefore take place at the same rate as the decoding of the first interpolated picture B1. That part DG2 of the second basic picture G2 which is decompressed in each case in the second decoding path DP1 is stored in the second search area memory SB2 in each case at least during the time in which that part of the first interpolated picture B1 for which the respectively decompressed part DG2 of the second basic picture G2 is required is reconstructed.

Using the first basic picture G1 stored in the reference picture memory RS, a part DG2 of the second basic picture G2 is decompressed, which part is stored in the second search area memory SB2.

The first basic picture G1 is output at the same time. The decoding and output of the first interpolated picture B1 via the first decoding path DP0 begins immediately after the output of the first basic picture G1.

Decoding takes place in the manner described above. That search area of the second basic picture G2 which is required for the decoding of the first macroblock line is present in the second search area memory SB2 after it has been decompressed via the second decoding path DP1 and stored in the second search area memory SB2.

During the decoding of the interpolated picture B1, the contents of the second search area memory SB2 must be constantly updated in a macroblock line-by-macroblock line manner via the second decoding path DP1. When updating the second search area memory SB2, which contains the search area from the second basic picture G2, access is made for this purpose to the reference picture memory RS in which the first basic picture G1 is stored.

In order to save further memory space and reduce the required computing power, the first a macroblock lines of the second basic picture G2 in decompressed form DG2 can be written to the second search area memory SB2 during the decoding of the last a macroblock lines of the interpolated picture B1. These first a macroblock lines of the second basic picture G2 in decompressed form DG2 are required if a second interpolated picture is to be reconstructed from the first basic picture G1 and from the second basic picture G2. As a result, the search areas are again available for decoding the next interpolated picture.

The decoding of subsequent interpolated pictures B1, where i designates an index for any desired number of interpolated pictures, which are reconstructed on the basis of the first basic picture G1 and of the second basic picture G2, can be carried out cyclically by the method described above.

As described above, therefore, a no longer required part of the decompressed part DG2 of the second basic picture G2 can in each case be overwritten in the second search area memory SB2 by a following decompressed part, of the second basic picture G2, which is required for the reconstruction of a following part, that is to say a following macroblock line, of the interpolated picture B1. As described above, a last part of an end part, which is no longer required for the reconstruction of a preceding interpolated picture, of the decompressed part DG2 of the second basic picture G2 can also be overwritten in the second search area memory SB2 by a beginning part of the decompressed part DG2, of the second basic picture G2, which is required for the reconstruction of a first part of a subsequent interpolated picture B2.

If a further basic picture G3 is received, then the second basic picture G2 is completely decompressed and stored in the reference picture memory RS. Since the first basic picture G1 is required for the complete decompression of the second basic picture G2, the said first basic picture G1 must likewise remain stored in the reference picture memory RS until the second basic picture G2 has been decompressed.

However, in order to reduce further the required memory space, it is possible successively to overwrite that part of the first basic picture G1 which is no longer required for the decompression of the second basic picture G2 by already decompressed parts of the second basic picture G2.

The further basic picture G3 is stored in the buffer memory PS. A new "cycle" of the method described above can thus begin.

In all of the methods described above, steps for transmitting data can be omitted, and the required data movement can thus be reduced, if the reference picture memory RS and the second search area memory SB2 are realized as one physical memory, since in this case it is not necessary to copy the data from the second search area memory SB2 to the reference picture memory RS.

In order to reduce the required memory space even further it is also possible to store the first basic picture G1 in compressed form in the reference picture memory RS. In this case, the reference picture memory RS can be dimensioned to be smaller than in the method in which the first basic picture G1 is stored in fully decompressed form in the reference picture memory RS.

Figure 3:
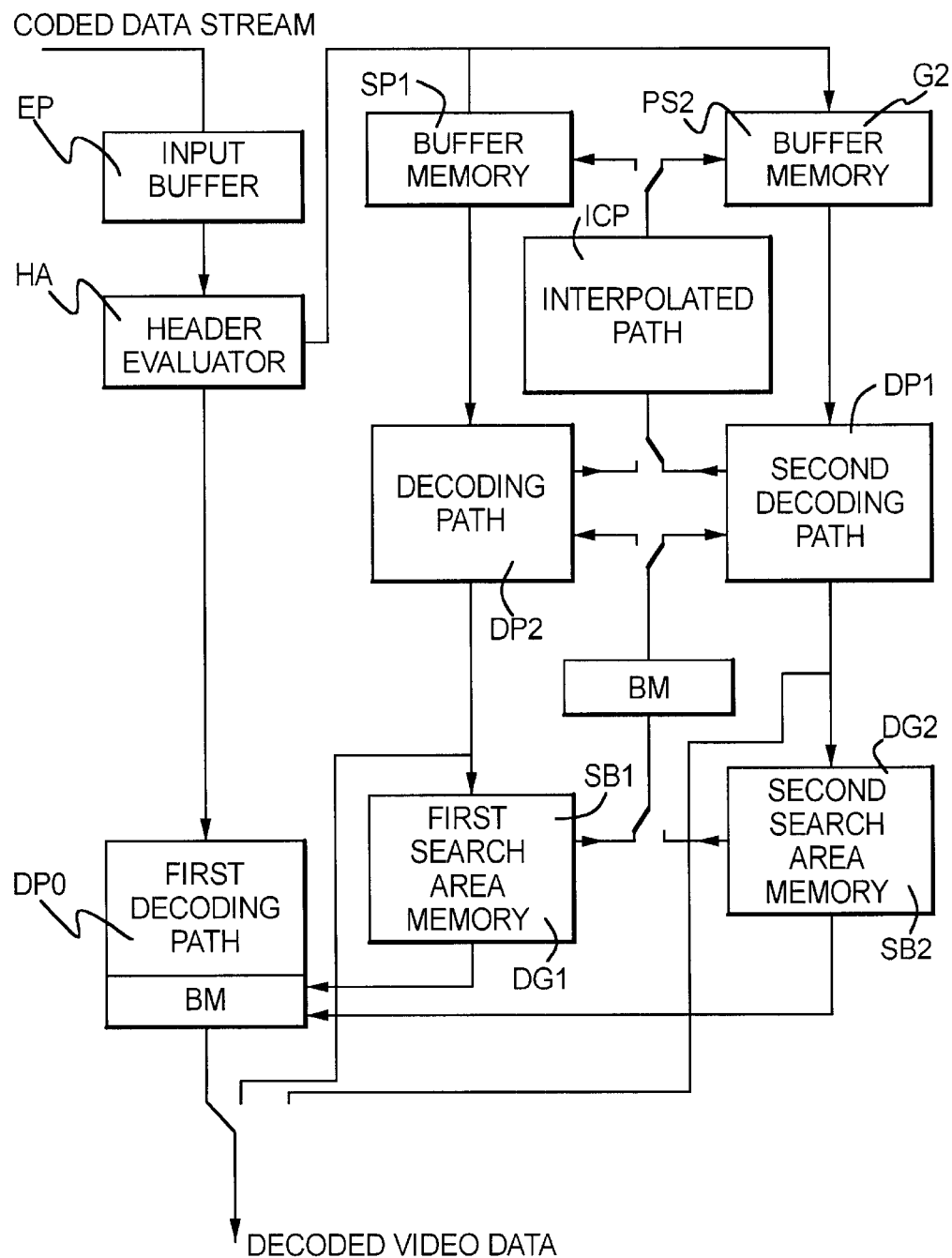
FIG. 3 shows a block diagram outlining the method of a further embodiment of the present invention.

In this case, that part of the first basic picture G1 which is required in each case for the reconstruction of the part of the interpolated picture B1 is in each case decompressed via a third decoding path DP2 and stored in a first search area memory SB1 (cf. FIG. 3). Consequently, a respective part of the first interpolated picture B1 is reconstructed using the respectively decompressed part DG1 of the first basic picture G1 which is situated in the first search area memory SB1 and using the decompressed part DG2 of the second basic picture G2 which is situated in the second search area memory SB2.

A no longer required part of the decompressed part DG1 of the first basic picture G1 is compressed again in an intra-coding path ICP. A no longer required part of the decompressed part DG2 of the second basic picture G2 is likewise compressed again in the intra-coding path ICP.

In this context, "no longer required" means that the part is no longer required for the reconstruction of the current part of the first interpolated picture B1.

The procedure when reconstructing a plurality of interpolated pictures B1 on the basis of the first basic picture G1 and of the second basic picture G2 corresponds to the procedure described above.

The procedure for when a further basic picture G3 is received has also been described above and is correspondingly applied in connection with the method when both the first basic picture G1 and the second basic picture G2 are stored in compressed form.

In the intra-coding path ICP, the coding transform which has been used to code, that is to say compress, the entire video data stream is used for the respective part to be processed.

Figure 4A:
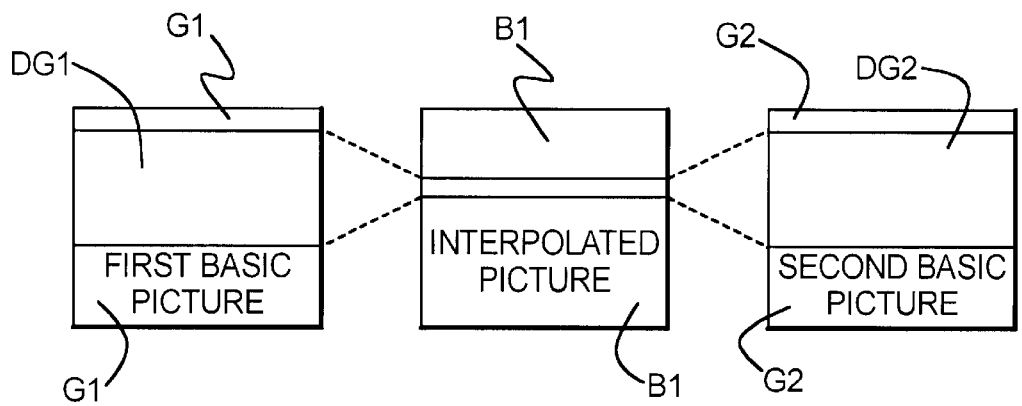
FIGS. 4a, 4b show a sketch outlining the decoded areas required for the reconstruction of a macroblock line of a B picture when using the method depicted in FIG. 3.
Figure 4B:
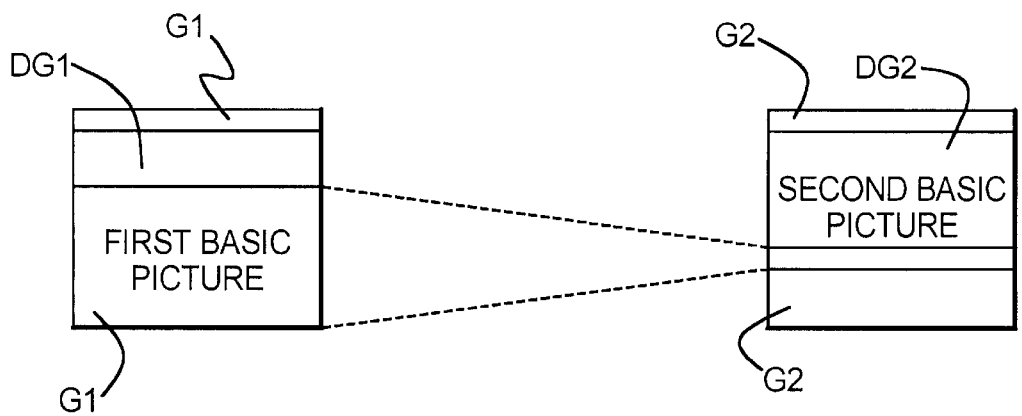

FIG. 4a illustrates, for the method employing storage of the first basic picture G1 and the second basic picture G2 in compressed form, the search area required in each case for the reconstruction of the first interpolated picture B1.

If the second basic picture G2 is a P picture, the required search area from the preceding reference picture, that is to say from the first basic picture Gi, must additionally be present in decoded form. Further a macroblock lines plus one macroblock line of the first basic picture G1 suffice for this purpose, since the search areas for the reconstruction of the interpolated picture B1 and for the decoding of the second basic picture G2 overlap (cf. FIG. 4b). The search area for the decoding of the second basic picture G2 overlaps with the search area required for the reconstruction of the interpolated picture B1 by exactly a macroblock lines.

In this case, too, it is possible to reduce the memory requirement further in that, for example, the no longer required part of the decompressed part DG1 of the first basic picture G1 is overwritten in the first search area memory SB1 by a following decompressed part, of the first basic picture G1, which is required for the reconstruction of a following part of the first interpolated picture B1. Likewise, the no longer required part of the decompressed part DG2 of the second basic picture G2 can also be overwritten in the second search area memory SB2 by a following decompressed part, of the second basic picture G2, which is required for the reconstruction of the following part of the first interpolated picture B1.

Correspondingly, if a plurality of interpolated pictures B1 are reconstructed using the first basic picture G1 and the second basic picture G2, a respective end part, which is no longer required for the reconstruction of a last part of a preceding interpolated picture, of the decompressed part DG1 of the first basic picture G1 can also be overwritten in the first search area memory SB1 by a beginning part of the decompressed part DG1, of the first basic picture G1, which is required for the reconstruction of a first part of a subsequent interpolated picture.

Likewise, an end part, which is no longer required for the reconstruction of the last part of the preceding interpolated picture, of the decompressed part DG2 of the second basic picture G2 can also be over-written in the second search area memory SB2 by a beginning part of the decompressed part DG2, of the second basic picture G2, which is required for the reconstruction of a first part of the subsequent interpolated picture.

In the event of a further basic picture G3 being received, the first basic picture G1 is stored in completely decompressed form and the second basic picture G2 in compressed form in the reference picture memory RS, and the further basic picture G3 is stored in compressed form in the buffer memory PS.

Since the video data stream is composed of a sequence of basic pictures and interpolated pictures, this method is carried out cyclically for all the pictures of the entire video data stream.

The above-described principles for the decoding of compressed video data streams can be correspondingly applied to a method for the iterative coding of compressed video data streams which likewise have a sequence of basic pictures G and interpolated pictures B.

During the coding of the video data stream, a first basic picture G1 is stored in the reference picture memory RS. The second basic picture G2 is stored in compressed form in an output buffer. In a manner corresponding to the procedure described above, for the construction of a respective interpolated picture B1, only a part of the compressed second basic picture G2 which is required for the construction of the part of the first interpolated picture B1 is decompressed DG2 and stored in a second search area memory SB2 during the time in which the part of the first interpolated picture B1 is constructed.

The respective part, that is to say the macroblock line, of the first interpolated picture B1 is constructed using the first basic picture G1 and the decompressed part of the second basic picture G2 which is situated in the second search area memory SB2. Options for reducing the required memory space, for example by overwriting no longer required parts of the decompressed part DG2 of the second basic picture G2 in the second search area memory SB2, have been described above and can likewise be employed in the coding method. The same applies to the construction of a plurality of interpolated pictures B1 using the first basic picture G1 and the second basic picture G2.

If the first basic picture G1 is also held in compressed form in the reference picture memory RS, that part DG1 of the first basic picture G1 which is required for the construction of the part of the interpolated picture B1 must also be decompressed in each case. That part of the first basic picture G1 which is required for the construction of the interpolated picture B1 is stored in a first search area memory SB1 during the time in which the interpolated picture B1 is constructed. Consequently, the part of the first interpolated picture B1 can be constructed using the decompressed part DG1 of the first basic picture G1 and the decompressed part DG2 of the second basic picture G2.

As described above, the required search area must be shifted in a macroblock line-by-macroblock line manner with the macroblock lines to be coded of the first interpolated picture B1 which is constructed.

When the first basic picture G1 is transmitted to a receiver unit, the second basic picture G2 is stored in the reference picture memory RS, and a further basic picture G3 is stored in compressed form in the output buffer A.

The method described above is carried out cyclically for the entire video data stream, since the entire video data screen also has a plurality of basic pictures and a plurality of interpolated pictures during coding.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for iterative decoding of compressed video data streams which have a sequence of basic pictures and interpolated pictures, comprising the steps of:
    storing a first basic picture in a reference picture memory;
    storing a second basic picture in compressed form in a buffer memory;
    iteratively executing the following steps for a reconstruction of at least a first interpolated picture, which steps are executed iteratively for reconstruction of every interpolated picture:
        decompressing only a part of the second basic picture, which is required for reconstruction of a part of the first interpolated picture,
        storing the decompressed part of the second basic picture in a second search area memory during a time in which the part of the first interpolated picture is reconstructed, and
        reconstructing the part of the first interpolated picture using the first basic picture and the decompressed part of the second basic picture.

2. The method according to claim 1, wherein a no longer required part of the decompressed part of the second basic picture is overwritten in a second search area memory by a following decompressed part, of the second basic picture, which is required for reconstruction of a following part of the first interpolated picture.

3. The method according to claim 1, wherein an end part, which is no longer required for reconstruction of a last part of a preceding interpolated picture, of the decompressed part of the second basic picture is overwritten in a second search area memory by a beginning part of the decompressed part of the second basic picture, which is required for reconstruction of a first part of a subsequent interpolated picture.

4. The method according to claim 1, wherein the first basic picture is stored in completely decompressed form in the reference picture memory.

5. The method according to claim 4,
    wherein, if a further basic picture is received, the second basic picture is completely decompressed,
    wherein the completely decompressed second basic picture is stored in the reference picture memory, and
    wherein a further basic picture is stored in compressed form in the buffer memory.

6. The method according to claim 1, wherein one physical memory is used to realize the reference picture memory and the second search area memory.

7. The method according to claim 1,
    wherein the first basic picture is stored in compressed form in the reference picture memory,
    wherein the following additional steps are provided for the reconstruction of the at least first interpolated picture, which steps are executed iteratively for reconstruction of every interpolated picture:
    only a part of the first basic picture which is required for the reconstruction of a part of the first interpolated picture is decompressed,
    the decompressed part of the first basic picture is stored in a first search area memory during a time in which the part of the first interpolated picture is reconstructed,
    the part of the first interpolated picture is reconstructed using the decompressed part of the first basic picture and the decompressed part of the second basic picture,
    the decompressed part of the first basic picture is compressed,
    the compressed part of the first basic picture is stored in the reference picture memory,
    the decompressed part of the second basic picture is compressed, and
    the compressed part of the second basic picture is stored in the buffer memory.

8. The method according to claim 7, wherein a no longer required part of the decompressed part of the first basic picture is overwritten in a first search area memory by a following decompressed part, of the first basic picture, which is required for reconstruction of a following part of the first interpolated picture.

9. The method according to claim 7, wherein an end part, which is no longer required for reconstruction of a last part of a preceding interpolated picture, of the decompressed part of the first basic picture is overwritten in a first search area memory by a beginning part of the decompressed part, of the first basic picture, which is required for reconstruction of a first part of a subsequent interpolated picture.

10. The method according to claim 7,
wherein, if a further basic picture is received, the first basic picture is completely decompressed,
wherein the second basic picture is stored in compressed form in the reference picture memory, and
wherein the further basic picture is stored in compressed form in the buffer memory.

11. The method according to claim 1, wherein the first basic picture is compressed, wherein the compressed first basic picture is stored in the reference picture memory, wherein the following additional steps are provided for construction of the at least first interpolated picture, which steps are executed iteratively for construction of every interpolated picture:
decompressing only a part of the compressed first basic picture which is required for construction of a part of the first interpolated picture,
storing the decompressed part of the first basic picture in a first search area memory during a time in which the part of the first interpolated picture is constructed, and
constructing the part of the interpolated picture using the uncompressed first basic picture and the decompressed part of the second basic picture.

12. A method for iterative coding of compressed video data streams which have a sequence of basic pictures and interpolated pictures, comprising the steps of:
storing a first basic picture in a reference picture memory;
compressing an uncompressed second basic picture;
storing the compressed second basic picture in an output buffer;
iteratively executing the following steps for construction of at least a first interpolated picture, which steps are executed iteratively for construction of every interpolated picture:
decompressing only a part of the compressed second basic picture, which is required for construction of a part of the first interpolated picture,
storing the decompressed part of the second basic picture in a second search area memory during a time in which a part of the first interpolated picture is constructed, and
constructing the part of the first interpolated picture using the first basic picture and the decompressed part of the second basic picture.

13. The method according to claim 12, wherein a no longer required part of the decompressed part of the second basic picture is overwritten by a following decompressed part, of the second basic picture, which is required for construction of a following part of the first interpolated picture.

14. The method according to claim 12, wherein an end part, which is no longer required for construction of a last part of a preceding interpolated picture, of the decompressed part of the second basic picture is overwritten in a second search area memory by a beginning part, of the second basic picture, which is required for construction of a first part of a subsequent interpolated picture.

15. The method according to claim 12, wherein the first basic picture is stored in uncompressed form in the reference picture memory.

16. The method according to claim 15,
wherein, when the first basic picture is transmitted to a receiver unit, the second basic picture is completely decompressed,
wherein the decompressed second basic picture is stored in the reference picture memory, and
wherein a further basic picture is stored in compressed form in the output buffer.

17. The method according to claim 16, wherein a no longer required part of the decompressed part of the first basic picture is overwritten by a following decompressed part, of the first basic picture, which is required for construction of a following part of the first interpolated picture.

18. The method according to claim 12,
wherein the first basic picture is compressed,
wherein the compressed first basic picture is stored in the reference picture memory,
wherein the following additional steps are provided for construction of the at least first interpolated picture, which steps are executed iteratively for construction of every interpolated picture:
decompressing only a part of the compressed first basic picture which is required for construction of a part of the first interpolated picture,
storing the decompressed part of the first basic picture in a first search area memory during a time in which the part of the first interpolated picture is constructed, and
constructing the part of the interpolated picture using the uncompressed first basic picture and the decompressed part of the second basic picture.

19. The method according to claim 18, wherein an end part, which is no longer required for construction of a last part of a preceding interpolated picture, of the decompressed part of the first basic picture is overwritten in a first search area memory by a beginning part, of the first basic picture, which is required for construction of a first part of a subsequent interpolated picture.

20. The method according to claim 18, wherein, when the first basic picture is transmitted to a receiver unit, a further basic picture is stored in compressed form in the first output buffer.

* * * * *